United States Patent
Subrahmanya et al.

(10) Patent No.: US 6,760,573 B2
(45) Date of Patent: Jul. 6, 2004

(54) FREQUENCY TRACKING USING INNER AND OUTER LOOPS

(75) Inventors: Parvathanathan Subrahmanya, Sunnyvale, CA (US); Jeremy H. Lin, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 10/261,976

(22) Filed: Oct. 1, 2002

(65) Prior Publication Data

US 2004/0009757 A1 Jan. 15, 2004

Related U.S. Application Data

(60) Provisional application No. 60/394,805, filed on Jul. 9, 2002.

(51) Int. Cl.[7] .................................................. H04B 1/18
(52) U.S. Cl. .................... 455/192.2; 455/139; 455/265; 455/260; 375/326; 375/344; 375/362
(58) Field of Search ................................. 455/132, 137, 455/138, 139, 136, 150.1, 154.1, 161.1, 164.1, 164.2, 192.1, 192.2, 192.3, 230, 255, 257, 260, 258, 259, 264, 265; 375/130, 324, 326, 327, 344, 354, 362, 375, 376, 147; 370/335, 342, 441

(56) References Cited

U.S. PATENT DOCUMENTS

| | | | | |
|---|---|---|---|---|
| 5,659,573 A | * | 8/1997 | Bruckert et al. | 375/355 |
| 6,389,060 B1 | * | 5/2002 | Naruse | 375/130 |
| 6,608,858 B1 | * | 8/2003 | Sih et al. | 375/147 |

FOREIGN PATENT DOCUMENTS

| | | | | |
|---|---|---|---|---|
| WO | WO0038343 A1 | * | 6/2000 | H04B/1/707 |
| WO | 0229978 A2 | | 4/2002 | |

* cited by examiner

*Primary Examiner*—Quochien B. Vuong
(74) *Attorney, Agent, or Firm*—Philip R. Wadsworth; Charles D. Brown; George C. Pappas (57) ABSTRACT

Techniques for inner/outer loop tracking that is stable and provides desirable loop convergence characteristics are disclosed. In one aspect, the contribution from any one inner loop to the tracking function of the outer loop is limited, to prohibit any one received signal component from dominating the outer loop. In another aspect, the rate of outer loop tracking variation is controlled to provide inner and outer loop stability. Various other aspects are also presented. These aspects have the benefit of providing stable inner and outer loop control, as well as efficient convergence and tracking by the various loops, resulting in reduced frequency error and improved communication performance.

30 Claims, 7 Drawing Sheets

FREQUENCY TRACKING USING INNER AND OUTER LOOPS

RELATED APPLICATIONS

This application claims the benefit of provisional U.S. Application Serial No. 60/394,805, entitled "VCTCXO TRACKING ALGORITHM," filed Jul. 9, 2002, which is incorporated herein by reference in its entirety for all purposes.

FIELD

The present invention relates generally to communications, and more specifically to a novel and improved method and apparatus for frequency tracking using inner and outer loops.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Non-CDMA systems include the AMPS and GSM systems.

Wireless communication systems commonly utilize local frequency references within various communication devices, such as base stations and mobile stations. The frequency references are used to modulate and demodulate transmitted data. For improved communication performance, and to maximize system resources, it is desirable for the various frequency references to be synchronized. However, inherent frequency differences between any two frequency references commonly exist due to variations in the manufacturing processes, among other factors. In addition, mobility of communication devices within a system (or mobility of obstacles off which reflected signals are received) can introduce frequency deviations due to Doppler. Frequency tracking loops are deployed to track and mitigate frequency errors between two communicating devices. Receiving stations may deploy inner tracking loops to track various multipath or soft-handoff signal components being received. In addition, an outer tracking loop may be deployed to track frequency differences in the local frequency reference of the receiving station. The interplay between the inner and outer loops can cause instability, leading to ineffective frequency tracking and thus to deterioration in communication performance. In addition, the response time, or convergence, of the various tracking loops can have an impact on performance as well. There is therefore a need in the art for inner/outer loop tracking that is stable and provides desirable loop convergence characteristics.

SUMMARY

Embodiments disclosed herein address the need in the art for inner/outer loop tracking that is stable and provides desirable loop convergence characteristics. In one aspect, the contribution from any one inner loop to the tracking function of the outer loop is limited, to prohibit any one received signal component from dominating the outer loop. In another aspect, the rate of outer loop tracking variation is controlled to provide inner and outer loop stability. Various other aspects are also presented. These aspects have the benefit of providing stable inner and outer loop control, as well as efficient convergence and tracking by the various loops, resulting in reduced frequency error and improved communication performance.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 6 depicts a flowchart of an embodiment of a method of initializing the outer loop when a mobile station powers on;

DETAILED DESCRIPTION

Figure 1:
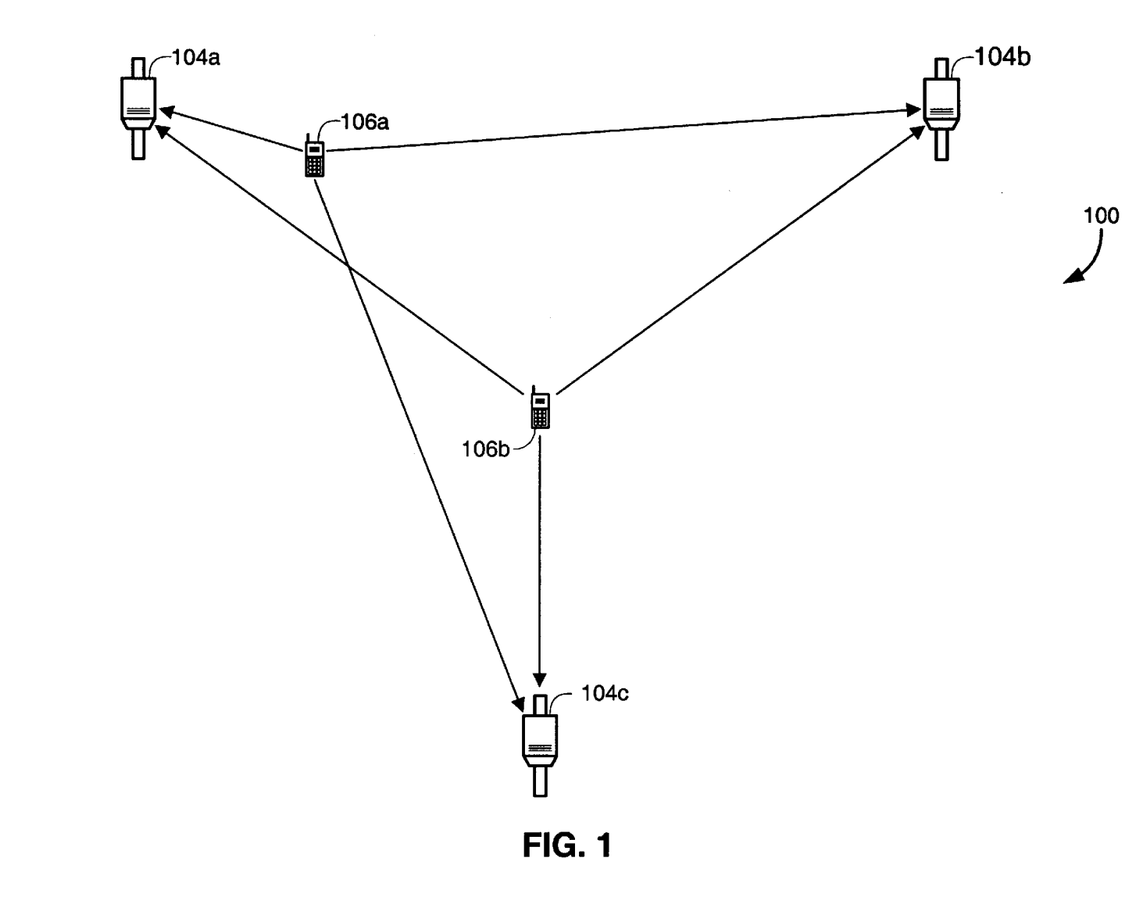
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Each base station 104 and mobile station 106 is equipped with a local timing reference used for modulation and demodulation of transmitted and received signals. In the exemplary embodiment, the local timing reference is a Voltage Controlled, Temperature Compensated Crystal Oscillator (VCTCXO). A transmitting station will modulate a signal for transmission using its local timing reference, and the signal will be demodulated at the receiving station using the receiving station's timing reference. Differences between the two timing references will lead to degradation of the communication performance. Ideally, every timing reference in the system would be identical, but in practice the frequency of the timing references differ between stations due to inherent differences due to the manufacturing process, among other factors. Frequency differences in timing references between two communicating stations will lead to timing drift. Known in the art are various methods for reducing the frequency differences. For example, a loop can be formed in a receiving station whereby a measurement of the difference between the timing of the received signal and the local timing reference is made, and the local timing reference is adjusted to minimize the difference.

In addition to timing drift due to the inherent difference between two stations' timing references, relative motion between the stations will introduce Doppler shift, another component of frequency error. The receiving station can employ a tracking loop, such as that described above, to remove both components of frequency error, without distinguishing between the causes of the error. A loop deployed to align the timing reference of a receiving station with one or more received signals will be referred to herein as an outer loop.

Figure 2:
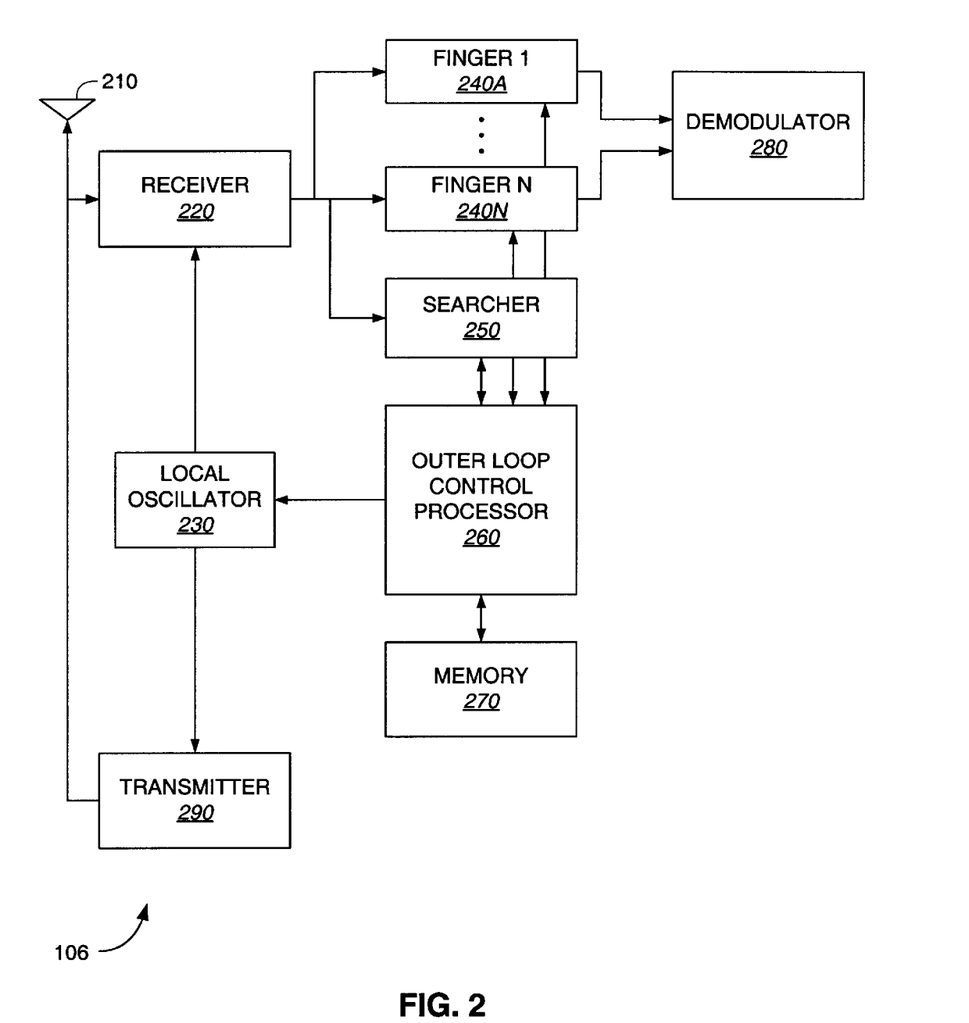
FIG. 2 depicts an exemplary embodiment of a mobile station.

FIG. 2 depicts an embodiment of a portion of an exemplary mobile station 106. For clarity of discussion, a mobile station is described as the exemplary embodiment. Thus, received signals correspond to forward link transmissions, and transmitted signals correspond to reverse link transmissions. As described above, the principles described herein with respect to mobile station 106 apply with equal force to a base station 104, i.e., received signals on the reverse link, and transmitted signals on the forward link. Those of skill in the art will readily apply the teachings herein to either scenario.

In FIG. 2, the mobile station's timing reference is local oscillator 230. In the exemplary embodiment, local oscillator 230 is a VCTCXO. Local oscillator 230 provides a timing reference to receiver 220, which conditions signals received via antenna 210 according to any wireless communication format, examples of which are described above. Examples of conditioning applied in receiver 220 include filtering, amplification, analog to digital conversion and similar techniques known in the art. In addition, z of received signals will be performed in response to the timing reference provided by local oscillator 230.

Local oscillator 230 receives a control signal from outer loop control processor 260. An exemplary VCTCXO will increase frequency according to the magnitude of a voltage of a certain polarity on the control signal, and decrease frequency according to the magnitude of a voltage of the opposite polarity on the control signal. The control signal can be an analog voltage level, or a digital signal converted to a voltage using any technique, examples of which are known in the art. One example is to deploy a pulse density modulator (PDM) circuit to receive a digital control signal from outer loop control processor 260 and convert it to the voltage required by the VCTCXO. The blocks shown in FIG. 2 are conceptual, for clarity of discussion, and those of skill in the art will recognize that such a circuit can be incorporated in the local oscillator 230, the outer loop control processor 260, or shared between the two. The details are not shown in FIG. 2. Any tunable local oscillator 230, using any technique known or yet to be developed, can be deployed as local oscillator 230 within the scope of the present invention. Outer loop control processor 260 will determine the local oscillator control signal in response to received signals, various embodiments for which are detailed below. As described above, the control of the common local oscillator 230 in response to signals received at receiver 220 via antenna 210 is referred to herein as the outer loop.

In alternate embodiments, outer loop processor 260 may be a Digital Signal Processor (DSP) or any general-purpose processor. Those of skill in the art will recognize that the methods and functions described herein with respect to outer loop control processor 260 can also be performed using special purpose hardware, co-processors, a combination of processors or DSPs, or a combination of all of the above. Various other blocks are described below, which may be operated under control of another processor (not shown). Some or all of the functions attributed to these various other blocks described may also be carried out in outer loop control processor 240 (in other words, a processor performing outer loop control as well as other processes). For clarity of discussion, a single processor is described, and outer loop control processor 260 may also be referred to herein simply as processor 260. Those of skill in the art will know how to trade off performing the various tasks using special purpose hardware, a general-purpose processor, or a combination of the two. Those of skill in the art will also readily partition the tasks described herein between two or more processors. Processor 260 will commonly contain, or be connected with, one or more memory elements 270 for storing instructions to carry out the various tasks and processes described herein as well as data storage.

In a typical wireless communication system, such as system 100, the communication channel will contain various obstacles, such as buildings or terrain features such as hills or valleys. A transmitted signal may reflect off obstacles or be blocked by obstacles, resulting in a plurality of copies of the transmitted signal arriving at the receiving station with varying amplitudes and phase and timing offsets. This phenomenon is known as multipath. When a receiving station is moving, such as a mobile station 106, the combination of multipaths may vary in response, due to the change in respective position between the receiving station, the transmitting station, and the various obstacles, which make up the channel. The multipath components may interfere with each other at the receiving station, thus degrading communication performance. A common technique used to mitigate the effects of multipath is to deploy a RAKE receiver, containing a plurality of elements referred to as fingers. Each finger can be assigned to receive, track, and demodulate a multipath component, and the output of one or more fingers can be combined constructively.

In addition to tracking multipath components of a transmitted signal from one base station 104, a mobile station may be equipped to receive signals from one or more additional base stations 104 concurrently (known in the art as soft handoff). The inherent differences between the local timing reference of the mobile station and the base stations are likely to be different. In addition, Doppler frequency error introduced by mobile station 104 movement can be very different from two base stations. In the extreme case, where a mobile station 106 travels directly away from one base station 104 and toward a second base station 104, the Doppler component of frequency error from one base station is the opposite of the Doppler component of frequency error from the other. Similarly, multipath components arriving due to reflections off various obstacles in the channel may also experience unique Doppler frequency shifts. For example, when a mobile station moves toward a source of a reflected signal and away from the transmitting source, the frequency error introduced into the two signals will have opposite polarity. In a typical mobile wireless environment, the Doppler components of frequency error in the various received signals (whether from multiple base stations in soft handoff or multiple components of a multipath signal) can change rapidly.

In the exemplary embodiment of FIG. 2, N finger elements, Finger 1-N, 240A–240N, respectively, are deployed as part of a RAKE receiver. Finger elements 240A–240N receive the output of receiver 220 and track and demodulate various multipath components. Processor 260 can assign one or more fingers to track one or more multipath components. In the exemplary embodiment, a finger tracks a multipath component corresponding to an assigned offset, the offset introduced into a Pseudorandom Noise (PN) sequence used for modulation and demodulation, techniques for which are well known in the art. In the exemplary embodiment, each finger element 240 performs time tracking on the assigned signal component. An exemplary method, known in the art, is to calculate an early and late energy, in addition to the assigned (or on-time) energy, to determine if a timing advance or retard is in order. As will be detailed further below, a finger element can be equipped to perform frequency tracking as well. Frequency tracking by a finger element is referred to herein as an inner loop. A finger can be deployed with a rotator to perform frequency error reduction that is specific to that finger. Thus, residual frequency error that is not removed with outer loop tracking (i.e. by controlling the VCTCXO in local oscillator 230) can be removed within the finger. This is described in further detail below. When a finger has been assigned to a particular signal component, and successfully tracks it (i.e., the energy calculated in the finger is maintained in accordance with certain conditions), the finger is said to be "in lock".

Searcher 250 is deployed to receive the output of receiver 220 and detect one or more multipath components. Searching techniques are known in the art, and any technique can be deployed for use in searcher 250. One example searching technique, applicable to combined inner and outer loop time tracking, as described herein, is disclosed in co-pending U.S. patent application Ser. No. 09/971,903 (hereinafter, the '903 application), entitled "METHOD AND APPARATUS FOR ACQUIRING PILOTS OVER CODE SPACE AND FREQUENCY ERRORS IN A CDMA COMMUNICATION SYSTEM", filed Oct. 4, 2001, and assigned to the assignee of the present invention. Searcher 250 can be equipped to test frequency hypotheses as well as offset hypotheses. A rotator can be deployed within searcher 250 for use in testing frequency hypotheses without requiring a corresponding adjustment in local oscillator 230.

In the exemplary embodiment, searcher 250 identifies PN offsets at which it appears likely that a valid signal (or multipath component) exists. These PN offsets can be assigned to finger elements 240 for tracking. A finger element assigned to an offset hypothesis can be used to further determine whether the hypothesis is a valid received signal. For example, an offset at which certain conditions have been met in searcher 250 may indicate a likely valid signal, or a first level of confidence in that offset. Once that offset has been assigned to a finger 240, if the finger can track the signal at that offset, i.e., the finger is in lock, then a second level of confidence in the validity of that offset is determined to exist.

The outputs of one or more fingers 240 are delivered to demodulator 280 to perform additional processing. Various demodulation techniques are known in the art. In the exemplary embodiment, one or more outputs from fingers that are in lock are coherently demodulated (using a pilot estimate at the same offset), then time-aligned and combined. The combined symbols are deinterleaved and decoded according to one of a variety of decoding techniques (such as Viterbi or turbo decoding). A block code may also be introduced on frames of transmitted data, for use in error detection or correction at the receiver. For example, a frame of data may be BCH decoded. Power control techniques may be applied to maintain the frame error rate at a desired level, to optimize system capacity for a desired level of service for any given communication channel. Note that an offset hypothesis which has passed the first and second confidence levels, described above, will reach a third, higher, confidence level once it has been demodulated and a frame has been decoded correctly. Any combination of demodulating or decoding schemes can be deployed within the scope of the present invention.

Note that in an alternate embodiment, the output of receiver 220 can be sampled and the samples stored in a memory (not shown). Then the samples can be retrieved and delivered to fingers 240 and/or searcher 250 for "offline" finger processing or searching. For clarity, this alternative is not detailed further in the ensuing discussion. Those of skill in the art will readily adapt the principles disclosed herein to various alternative techniques for processing received data, such as the offline processing example just given.

Outer loop control processor 260 is shown connected to searcher 250. Searcher 250 can provide hypothesis information for use in assigning offsets to fingers 240. The results of outer loop processing, detailed further below, can also be used to configure searcher 250 for searching. Fingers 240 are also connected to outer loop control processor 260. As before, processor 260 can be used to assign fingers to track signal components, in response to searcher 250 output, for example. In addition, the fingers provide frequency error and other feedback, such as the relative signal strength of the signal assigned to the finger, to processor 260 for use in controlling the outer loop. This is detailed further below.

Mobile station 106 can also transmit data (i.e., on the reverse link), via antenna 210 and transmitter 290. Data for transmission (the source of which is not shown, but examples of which are commonly known in the art) is conditioned in transmitter 290 according to one or more wireless communication formats, examples of which are given above. Example components that may be included in transmitter 290 include encoders, interleavers, spreaders, modulators of various types, amplifiers, filters, digital-to-analog (D/A) converters, radio frequency (RF) converters, and the like. Note that data for transmission is commonly conditioned in response to a local timing reference. Thus, a connection is shown between local oscillator 230 and transmitter 290. A transmitter 290 may also be deployed with a frequency error correction device, such as a rotator, for introducing frequency corrections in addition to that provided by the outer loop control (detailed further below).

Figure 3:
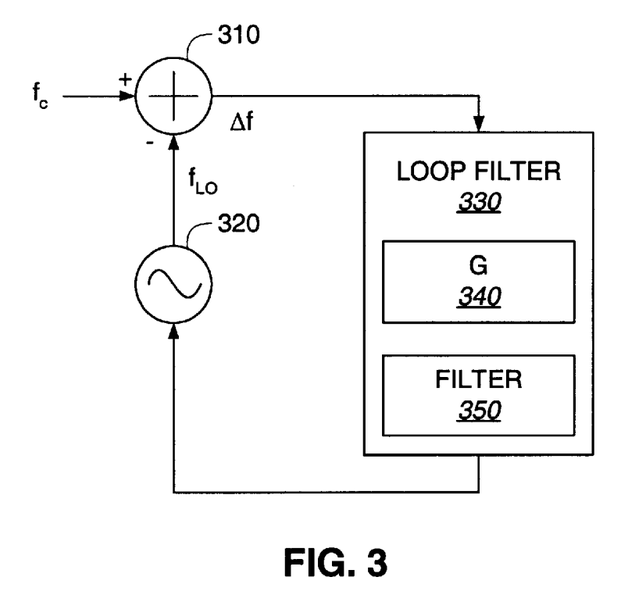
FIG. 3 depicts a conceptualized frequency tracking loop.

FIG. 3 depicts a conceptualized frequency tracking loop. The outer loop frequency control, described herein, is conceptually similar to the loop shown in FIG. 3 (although modified to operate in conjunction with one or more inner loops, as detailed further below). The frequency associated with the timing reference in the transmitting station, i.e., the carrier frequency, $f_c$, is estimated or extracted from a received signal. The frequency associated with the local timing reference (or local oscillator, such as a VCTCXO), $f_{LO}$, is generated in local oscillator 320. A frequency error, $\Delta f$, is computed as the difference between $f_C$ and $f_{LO}$ in summer 310. The frequency error drives a loop filter 330 to produce a tuner control signal for adjusting local oscillator 320. In steady state (and assuming the circuit is set up properly for stability, described further below), the loop shown in FIG. 3 will drive the frequency error close to zero (as determined by the tolerances and precision of the deployed circuit), and the local oscillator will closely match the frequency in the timing reference of the transmitting station (adjusted for channel effects and Doppler, as appropriate). A loop filter 330 generally comprises a gain element 340 and a filter 350. Filter 350 is commonly a low pass filter, such as an accumulator, used to smooth out rapid changes in frequency error estimates that may be noisy. The gain factor G in gain element 340 can be chosen such that frequency tracking is rapid (higher gain) or slower (lower gain). The gain and filter components of a loop filter can be tailored to provide stability of the loop, speed of acquisition (or settling to steady state), and sensitivity to noise. Design tradeoffs can be made which depend in part on the maximum amount of frequency error that needs to be corrected (including Doppler effects), the maximum rate of change of doppler, and the maximum rate of change of local oscillator frequency due to other factors such as changes in temperature. Techniques for loop filter design are known in the art. The filter output may be converted as appropriate to generate the control signal for the oscillator (details not shown).

In contrast to the conceptual frequency-tracking loop depicted in FIG. 3, in the exemplary embodiment, the outer loop responds to frequency errors calculated in one or more inner loops. Thus, the outer and inner loops interrelate, and changes in each affect the others. A variety of aspects of an outer loop control method are detailed below, each of which contributes to stability of the various loops while maintaining a desired level of communication performance.

Figure 4:
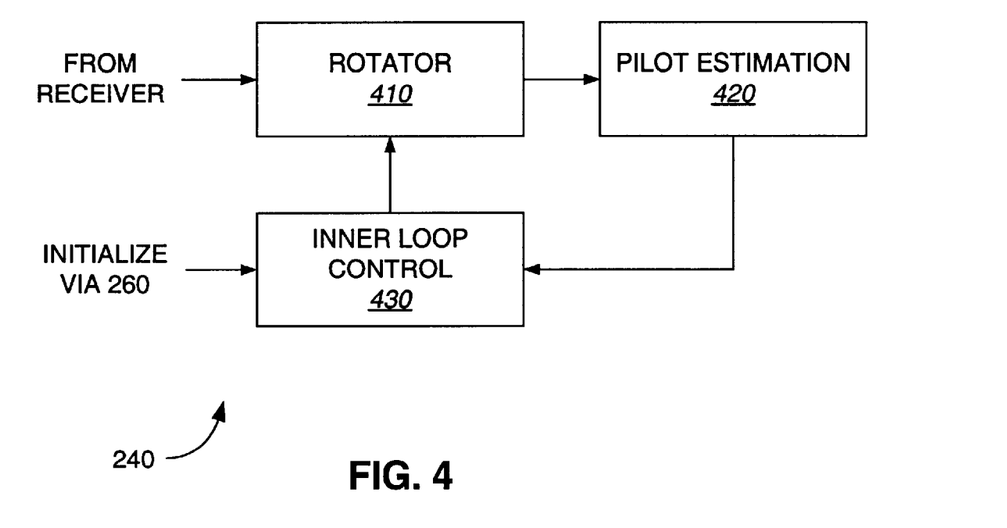
FIG. 4 depicts a portion of an exemplary finger.

FIG. 4 depicts a portion of an exemplary finger 240, relating to the inner loop associated with the finger. A signal is delivered to rotator 410 from receiver 220. Rotator 410 performs a frequency adjustment on the received signal in response to a frequency control signal generated in inner loop control 430. Pilot estimation block 420 receives the rotated output and computes pilot estimates. The pilot estimates are delivered to inner loop control 430 to determine if frequency error exists. If so, the frequency control signal is generated so as to perform the frequency adjustment in rotator 410. Inner loop control 430 can be initialized via outer loop control processor 260 (detailed further below). Inner loop control 430 generates a frequency error estimate (also referred to herein as freq_est) for delivery to the outer loop control processor 260 and used for outer loop control, detailed further below. The frequency error computed in a finger is used to perform inner loop frequency correction that is specific to the signal component being tracked by the finger. Thus, the frequency error is an estimate of the frequency error of the local oscillator, relative to the specific signal component. In the exemplary embodiment, an estimate of the pilot signal strength seen in the finger is also delivered to processor 260.

Those of skill in the art will recognize alternative embodiments that fall within the scope of the present invention. For example, an alternate signal, related to the frequency of the finger can be delivered in lieu of the frequency error, and the appropriate adjustments can be made in response. As another example, any metric corresponding to the received signal strength in a finger, relative to the other fingers, can be delivered instead of estimated pilot signal strength.

Various techniques for inner loop frequency control are known in the art, and any such technique known, or developed in the future, that provides a frequency error estimate or similar metric, can be deployed within the scope of the present invention. In an exemplary embodiment, two consecutive pilot samples are generated. The cross product is computed to estimate the angle between the two samples. Based on the angle, it can be determined whether the phase difference was positive or negative, as well as its magnitude. The angle can be multiplied by a filter gain, and accumulated, to provide the frequency adjustment signal to the rotator. The accumulated angle phases provide an estimate of the outer loop frequency error relative to the signal being tracked by the finger.

Recall from FIG. 2 that outer loop control processor 260 receives frequency estimates from each of the N fingers 240. These frequency estimates can be used in calculating the local oscillator control. In any given embodiment, a portion of the frequency error can be removed using the outer loop, and the remainder of any frequency error for a specific multipath component can be removed in each respective inner loop. Since the Doppler component of the frequency error for each path being tracked can be different, one exemplary interrelationship between the inner loops and the outer loop is to remove the average frequency error with the outer loop and let each inner loop remove the residual frequency error for their respective path. These and other variations are disclosed in co-pending U.S. patent application Ser. No. 09/972,514, entitled "METHOD AND APPARATUS FOR ACQUIRING AND TRACKING PILOTS IN A CDMA COMMUNICATION SYSTEM", filed Oct. 5, 2001, assigned to the assignee of the present invention, and incorporated by reference herein.

Figure 5:
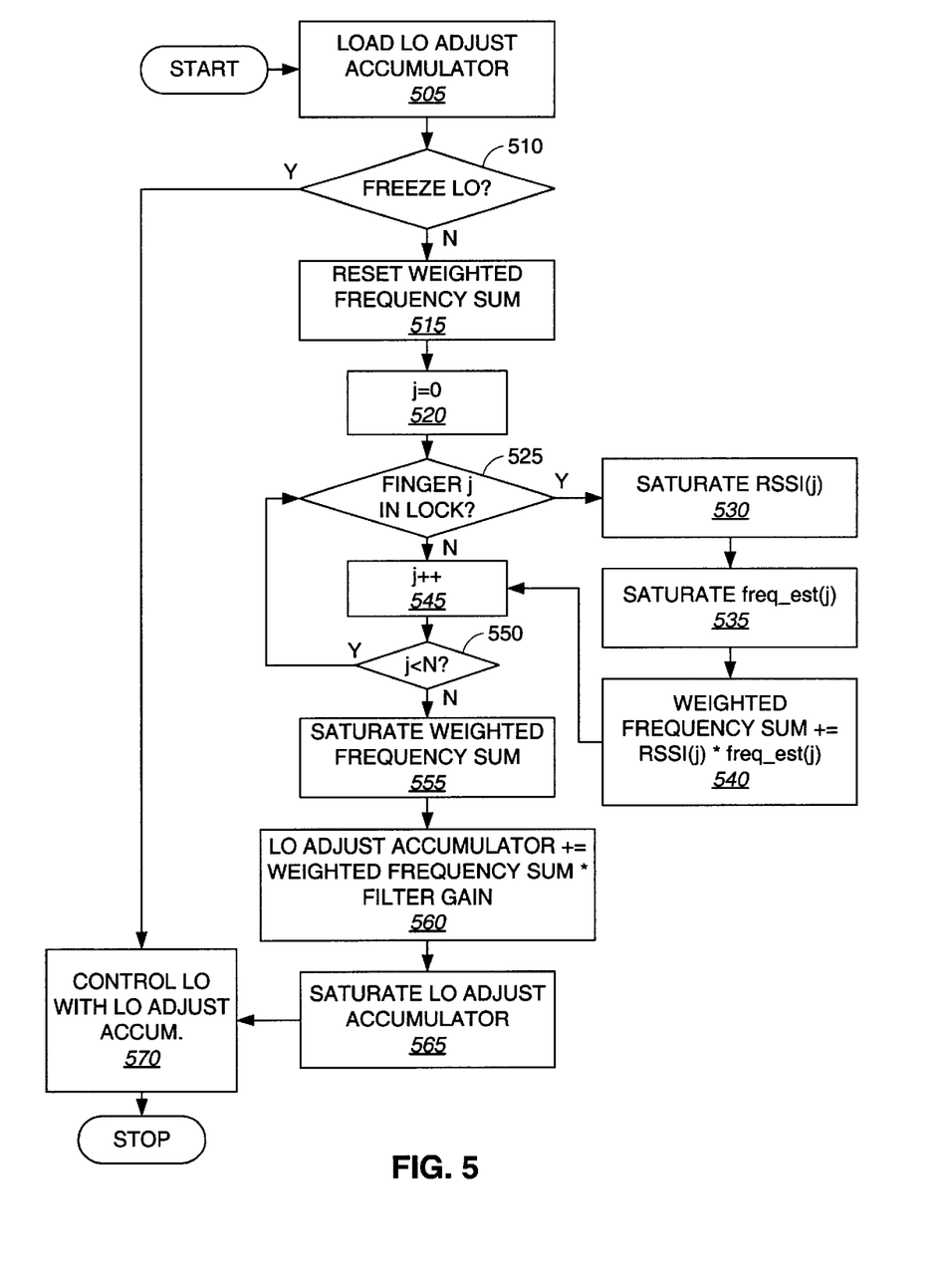
FIG. 5 depicts a flowchart of an embodiment of a method of controlling an outer loop in conjunction with one or more inner loops.

FIG. 5 depicts a flowchart of an embodiment of a method of controlling an outer loop in conjunction with one or more inner loops. The various steps are described below, some of which contain exemplary parameters. The flowchart of FIG. 5 is exemplary only, and myriad alternate embodiments, also falling within the scope of the present invention, can be generated using subsets of the steps shown, or alternate parameters, as detailed further below. The process starts in step 505. A local oscillator adjust accumulator is used as a filter in controlling the local oscillator, and thus the outer loop. It is possible to pre-load this accumulator to achieve a certain desired initialization. A variety of initial settings for use in various situations can be deployed. In step 505, the local oscillator adjust accumulator is pre-loaded if desired. Proceed to decision block 510.

In decision block 510, the local oscillator can be frozen at the current frequency if disabling tracking is desired. Various circumstances in which this may be desirable are detailed further below. When the local oscillator is frozen, it continues to produce the frequency output directed just prior to freezing. If the local oscillator is to be frozen, proceed to step 570. In step 570, control the local oscillator with the current value of the local oscillator adjust accumulator. Since the rest of the process depicted in FIG. 5 has been bypassed, the accumulator is unchanged, thus keeping the local oscillator operating at its current frequency. Then the process stops (those of skill in the art will recognize that this process can be iterated indefinitely to provide continuous outer loop control).

If, in decision block 510, the local oscillator is not to be frozen, the tracking portion of the process begins. Proceed to step 515, and reset a weighted frequency sum variable (weighted_freq_sum=0). Proceed to step 520 to initialize a loop index j to zero. The index j will be used to loop through all the fingers. Proceed to decision block 525 to determine if finger j is in lock. If not, the output of that finger is not used in updating the outer frequency tracking loop. Proceed to block 545 and increment j. Then, proceed to decision block 550 to test whether j is less than N, the total number of fingers. If so, return to decision block 525 to test the next finger. If j is equal to N, the process continues with step 555.

If, in decision block 525, finger j is in lock, proceed to step 530. In step 530, the received signal strength indicator (RSSI) of finger j is saturated (RSSI(j) is the saturated signal strength metric of the $j^{th}$ finger). In the exemplary embodiment the saturated RSSI value falls within the range [0,127]. Proceed to step 535 to saturate the frequency estimate of the finger (freq_est(j) is the saturated frequency estimate of the $j^{th}$ finger). In the exemplary embodiment, the saturated frequency estimate falls within the range [−128,127]. Recall that in the exemplary embodiment of FIG. 2, the RSSI and freq_est values from each finger 240 are delivered to outer control loop processor 260. As described above, alternates to RSSI and freq_est are available and fall within the scope of the present invention. Proceed to step 540 to update the weighted frequency sum by adding to it the product of the saturated RSSI and freq_est values (weighted_freq_sum+=RSSI(j)*freq_est(j)). The signal strength measurement, RSSI(j) in this embodiment, is used to provide a weighting for the consideration of the frequency estimate of the finger.

The RSSI component of the finger is saturated in order to keep one finger from completely dominating the other in-lock fingers (step 530). The intent is to use the inner loops to track the Doppler effects and to use the outer loop to track the average frequency error. The saturation prevents one finger, receiving a dominant path component, from forcing the outer loop to follow the Doppler of one path, which would result in the other inner loops being forced to counteract that finger-specific action introduced into the outer loop. A rapid change in Doppler from an over-dominant finger would require all the inner loops, as well as the outer loops, to re-converge. Rapid shifts in Doppler of a moving mobile station can be quite common. Any saturation range can be deployed, and those of skill in the art will readily adapt the saturation range to limit the contribution of any one finger as desired.

The frequency estimate of each finger is saturated (step 535) to make multiplication simpler (and therefore more efficient in a processor such as processor 260). Saturation also eliminates overflow and underflow issues. Any saturation range can be deployed, and those of skill in the art will readily adapt the saturation range as desired.

Proceed to step 545 and continue as described above. Once all the fingers have been tested, and the weighted frequency estimates of the in-lock fingers have been incorporated into the overall weighted frequency estimate (weighted_freq_sum), proceed to step 555. In step 555 the weighted frequency sum is saturated. In the exemplary embodiment, the weighted frequency sum falls within the range [−128,127]. The weighted frequency sum is saturated to prevent instability. The change from iteration to iteration is kept slow enough to allow the inner loops to re-converge in between outer loop control changes. In the exemplary embodiment, the outer loop is updated every 10 ms. By contrast, the inner loops update every 512 chips, which is on the order of 100 microseconds. The rate of change is related to the saturation range, and any saturation range can be deployed. Those of skill in the art will readily adapt the saturation range to provide stability for myriad combinations of inner and outer loop update speeds. Proceed to step 560.

In step 560, the saturated weighted frequency sum is multiplied by a filter gain, and the result is added to the local oscillator adjust accumulator. As described above, those of skill in the art will readily choose suitable filter gain values for the desired communication performance. Proceed to step 565. In step 565 the local oscillator adjust accumulator is saturated. In the exemplary embodiment, the saturation is 28 bits, or a range of $[0, 2^{28}-1]$. This saturation is used to put the accumulator value in PDM range for controlling the VCTCXO. Alternate embodiments need not saturate, or may use alternate saturation ranges, as will be readily apparent to those of skill in the art. Proceed to step 570 and control the local oscillator with the local oscillator adjust accumulator, as described above. Then the process can stop.

Figure 6:
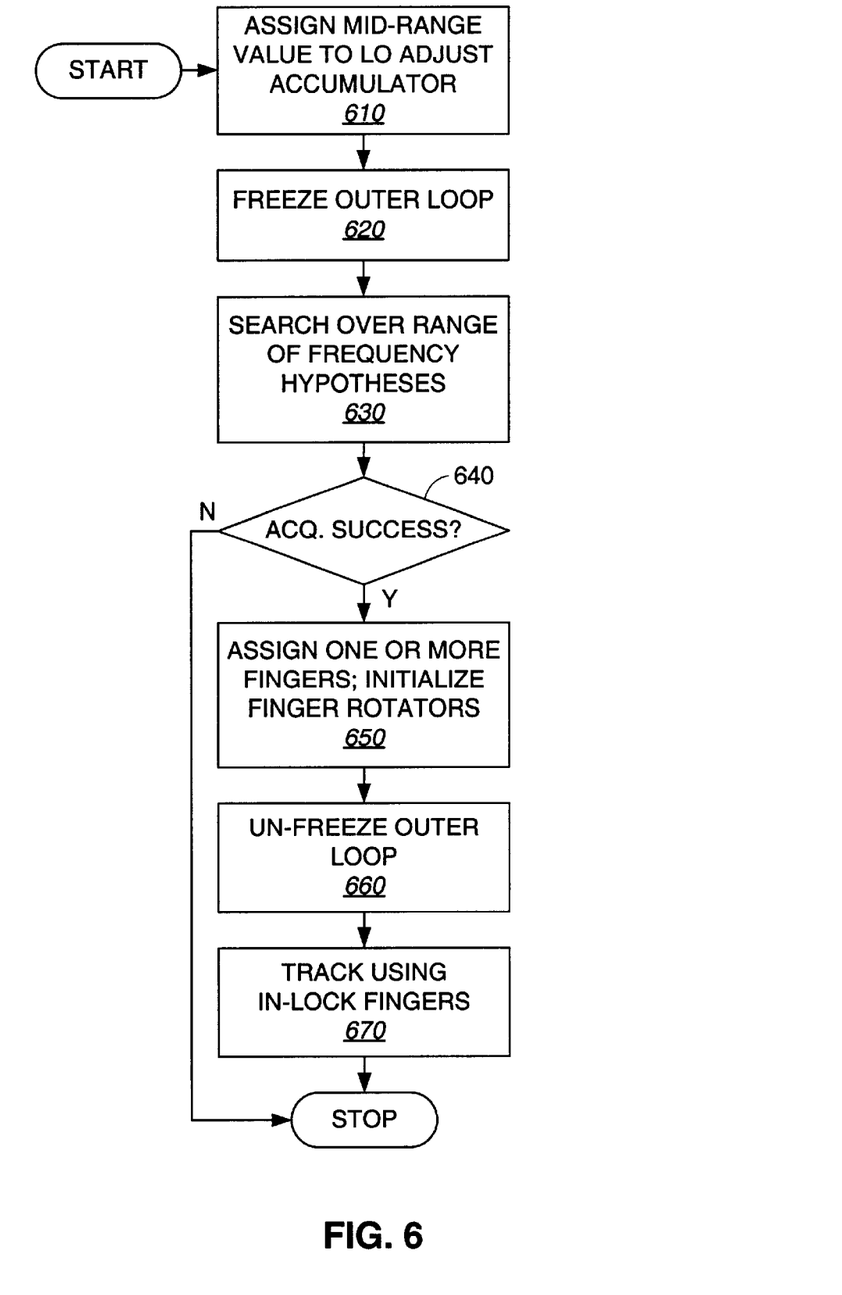

FIG. 6 depicts a flowchart of an embodiment of a method of initializing the outer loop when a mobile station powers on. The process begins in step 610. At power-on, the mobile station has no knowledge about its frequency error. Therefore it sets the local oscillator to mid-scale in step 610. Proceed to step 620. In step 620, the outer loop is frozen, as there are no fingers currently tracking any valid paths from which a frequency error estimate for driving the outer loop can be computed. Proceed to step 630 to perform a search for received signals. The search may be performed over any range of offset hypotheses, and over a range of frequency hypotheses to account for the range of frequency errors that may be seen when the outer loop has not yet converged. A rotator in the searcher can be used to test various frequency hypotheses. In an alternative embodiment, the local oscillator can be varied to perform hypothesis tests at various frequencies. Exemplary techniques are disclosed in the '903 application. Proceed to decision block 640. In decision block 640, if the search yields one or more candidates for which acquisition is successful, proceed to step 650. If not, the process can be terminated (and repeated in the future, as necessary). Various tests can be employed to determine if acquisition is successful. One exemplary test is to determine if one or more fingers can successfully track a signal to which it is assigned (referred to as finger pull-in). A more stringent test may be to wait until data is correctly demodulated and decoded.

In step 650, assign one or more fingers to located paths (this may be performed as part of acquisition detection, as just described). The finger rotators can be initialized according to the frequency hypotheses for the paths. By initializing a finger's rotator value with a successful hypothesis, the finger's chances of pull-in are improved. Proceed to step 660. In step 660, un-freeze the outer loop. Proceed to step 670 to perform outer loop tracking using the in-lock fingers. Steps 660 and 670 can be performed using a method such as that described in FIG. 5, above. Following step 670, power-on initialization of the outer loop is complete, and the process can be terminated.

Figure 7:
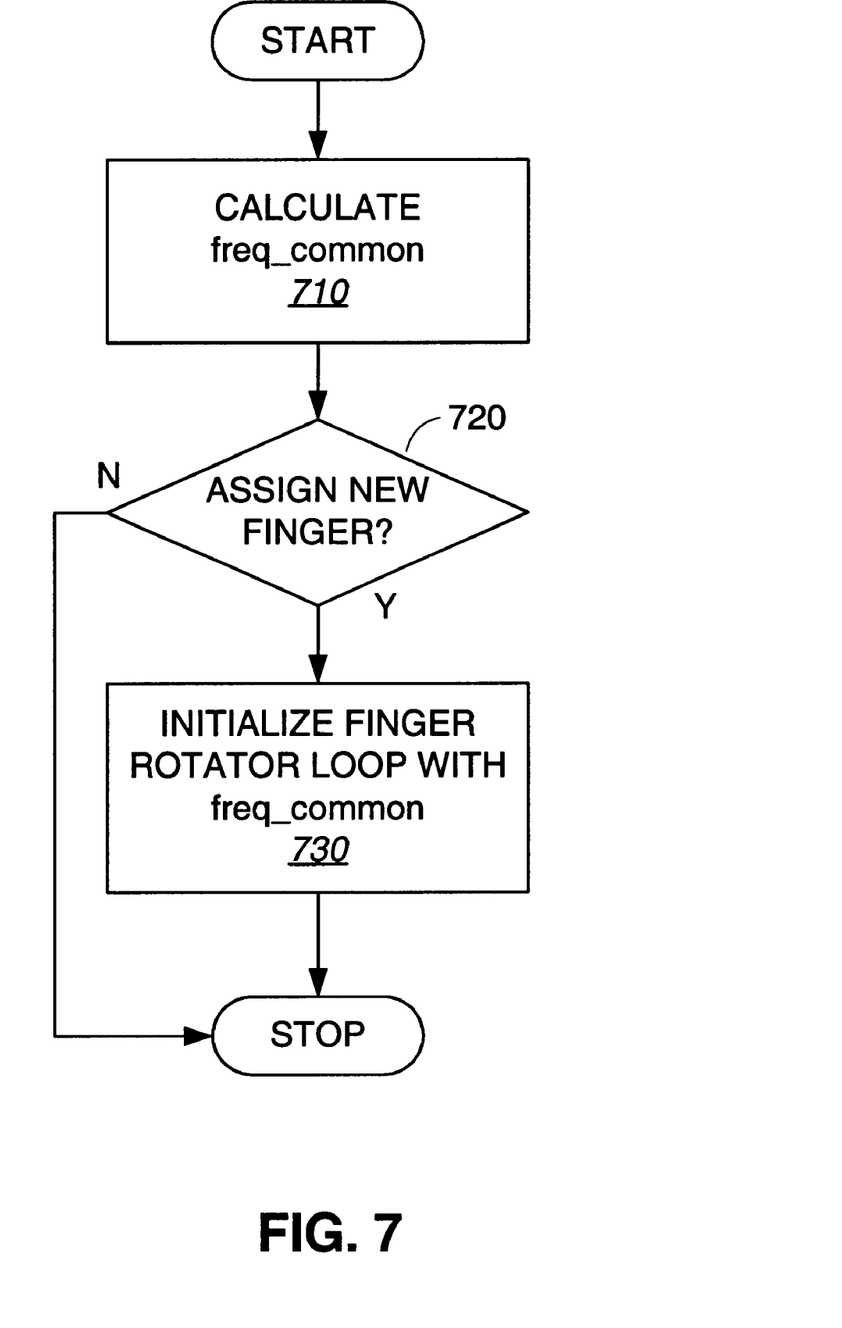
FIG. 7 depicts a flowchart of an exemplary embodiment of a method of initializing a finger once frequency tracking has been established.

FIG. 7 depicts a flowchart of an exemplary embodiment of a method of initializing a finger once frequency tracking has been established. The process begins in step 710, where freq_common, an average of the frequency error of the in-lock fingers, is calculated. Proceed to decision block 720. In decision block 720, if a new finger is to be assigned proceed to step 730, otherwise the process terminates. In step 730, initialize the new finger rotator loop with freq_common. Assigning the average frequency error of the in-lock fingers increases the chance of pull-in for the new finger, and decreases the amount of time required for the new finger's inner loop to converge.

Figure 8:
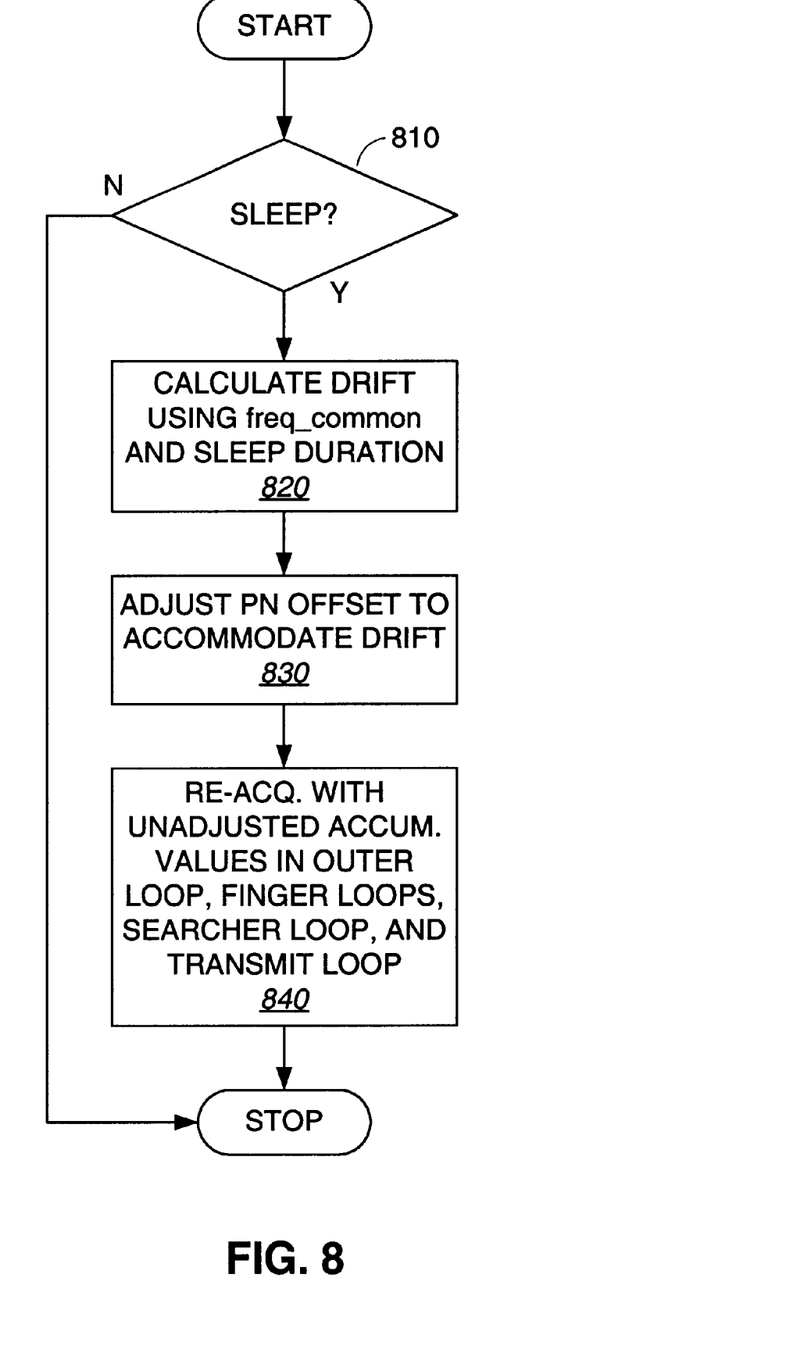
FIG. 8 depicts a flowchart of an exemplary embodiment of a method of sleeping while operating the outer loop.

FIG. 8 depicts a flowchart of an exemplary embodiment of a method of sleeping, or utilizing a very low power mode in the mobile station, while operating the outer loop. Typically, in sleep mode, a mobile station must wake up periodically to determine if it should access the network for any reason, such as a page for an incoming call. To conserve power and increase standby time, the mobile station should wake up and determine as quickly as possible if it can return to the sleep state. While the mobile station is sleeping, there can be frequency drift between the local timing references in the base station and the mobile station, since the frequency tracking loops are not operating. Note that, in steady state, the local oscillator error is tuned out and freq_common, or the average of the frequency error of the in-lock fingers, will be small. If there are no fingers assigned, or if all the fingers are out of lock, the loops are frozen, so freq_common is not adjusted (neither is the accumulator for the outer loop updated, as described above with respect to FIG. 5). If the mobile station does not reach steady state before such an occurrence, i.e., during sleep mode, the frequency error could persist for a long time.

To mitigate these effects, the process begins in step 810. If the mobile station is going to sleep (or any other mode in which the outer loop, and the updating of freq_common, is frozen), proceed to step 820. If the mobile station is not going to sleep, the process can stop. In step 820, the amount of drift to be expected during sleep is computed, as a function of freq_common and the time duration of the sleep cycle. Proceed to step 830. In step 830, adjust the PN offset of the PN sequence to accommodate the expected frequency drift. This can be done prior to sleep or after wake-up. Proceed to step 840. After the sleep cycle is concluded, reacquisition can proceed using unadjusted accumulator values in the outer loop, inner loops (of the fingers), any searcher loop, and any transmit loop.

It should be noted that in all the embodiments described above, method steps can be interchanged without departing from the scope of the invention. Those of skill in the art will also recognize that any of the methods detailed in FIGS. 5–8 can be combined as desired.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:

a plurality of inner loops, each for tracking a component of a received signal, and for generating a frequency error estimate and a component signal strength indicator in response thereto; and an outer loop control processor for:
receiving the plurality of frequency error estimates and the corresponding plurality of component signal strength indicators;
limiting each component signal strength indicator to a pre-determined maximum signal strength parameter;
generating a weighted average of the plurality of frequency error estimates weighted respectively by the plurality of limited component signal strength indicators; and
generating a timing reference control signal in response to the weighted average.

2. The apparatus of claim 1, wherein the outer loop processor further limits the plurality of frequency error estimates to a pre-determined maximum frequency error parameter.

3. The apparatus of claim 1, further comprising a timing reference, the frequency of the timing reference variable in response to the timing reference control signal.

4. The apparatus of claim 3, wherein the weighted average is computed over the frequency errors corresponding to inner loops determined to be in lock.

5. The apparatus of claim 3, wherein the outer loop control processor further limits the weighted average to a pre-determined maximum frequency error parameter prior to generating the timing reference control signal.

6. The apparatus of claim 5, further comprising an accumulator for receiving and accumulating the weighted average, the accumulator output for use in generating the timing reference control signal.

7. The apparatus of claim 6, wherein the accumulator is updated when one or more of the plurality of inner loops is determined to be in lock.

8. The apparatus of claim 6, wherein the accumulator is loadable with an initialization value.

9. The apparatus of claim 6, wherein the outer loop control processor further limits the weighted average to a pre-determined maximum frequency error parameter, prior to generating the timing reference control signal.

10. The apparatus of claim 1, wherein the outer loop control processor further computes a common frequency error estimate and one or more inner loops are initialized with the common frequency error estimate.

11. The apparatus of claim 10, operable with a searcher for acquiring received signal components using a pseudo-random noise (PN) sequence, wherein:
the variation of the timing reference control signal is ceased for a variable time period;
a frequency drift estimate is calculated in response to the common frequency error estimate and the variable time period; and
the PN sequence is adjusted in response to the frequency drift estimate for reacquisition subsequent to the variable time period.

12. An apparatus comprising:

a plurality of inner loops, each for tracking a component of a received signal, and for generating a frequency error estimate and a component signal strength indicator in response thereto; and an outer loop control processor for:
receiving the plurality of frequency error estimates and the corresponding plurality of component signal strength indicators;
generating a weighted average of the plurality of frequency error estimates weighted respectively by the plurality of component signal strength indicators;
limiting the weighted average to a pre-determined maximum frequency error; and
generating a timing reference control signal in response to the limited weighted average.

13. A wireless communication device comprising:

a plurality of inner loops, each for tracking a component of a received signal, and for generating a frequency error estimate and a component signal strength indicator in response thereto; and an outer loop control processor for:
receiving the plurality of frequency error estimates and the corresponding plurality of component signal strength indicators;
limiting each component signal strength indicator to a pre-determined maximum signal strength parameter;
generating a weighted average of the plurality of frequency error estimates weighted respectively by the plurality of limited component signal strength indicators; and
generating a timing reference control signal in response to the weighted average.

14. A wireless communication system, including a wireless communication device, comprising:

a plurality of inner loops, each for tracking a component of a received signal, and for generating a frequency error estimate and a component signal strength indicator in response thereto; and an outer loop control processor for:
receiving the plurality of frequency error estimates and the corresponding plurality of component signal strength indicators;
limiting each component signal strength indicator to a pre-determined maximum signal strength parameter;
generating a weighted average of the plurality of frequency error estimates weighted respectively by the plurality of limited component signal strength indicators; and
generating a timing reference control signal in response to the weighted average.

15. A method of frequency tracking, operable with a plurality of frequency tracking inner loops, comprising:
receiving a signal strength indicator and a frequency error estimate from each of the plurality of inner loops;
limiting each signal strength indicator to a maximum signal strength parameter;
computing a weighted average frequency error over the plurality of frequency error estimates weighted by the respective plurality of limited signal strength indicators; and
generating a timing reference control signal in response to the weighted average frequency error.

16. The method of claim 15, further comprising generating a timing reference with frequency variable in response to the timing reference control signal.

17. The method of claim 15, further comprising limiting the weighted average frequency error to a maximum frequency error parameter prior to generating the timing reference control signal.

18. The method of claim 15, further comprising accumulating the weighted average frequency error prior to generating the timing reference control signal.

19. The method of claim 18, further comprising limiting the accumulated weighted average frequency error to a maximum accumulation parameter prior to generating the timing reference control signal.

20. The method of claim 18, further comprising initializing the accumulation prior to generating the weighted average.

21. The method of claim 15, further comprising computing a common frequency error estimate.

22. The method of claim 21, further comprising initializing one or more inner loops with the common frequency error estimate.

23. The method of claim 21, further comprising:
ceasing to update the timing reference control signal for a time period;
estimating frequency drift in response to the common frequency error estimate and the time period; and
adjusting a PN sequence in response to the frequency drift estimate.

24. A method of frequency tracking, operable with a plurality of frequency tracking inner loops, comprising:
receiving a signal strength indicator and a frequency error estimate from each of the plurality of inner loops;
computing a weighted average frequency error over the plurality of frequency error estimates weighted by the respective plurality of signal strength indicators;
limiting the weighted average frequency error to a maximum frequency error; and
generating a timing reference control signal in response to the limited weighted average frequency error.

25. An apparatus, comprising:
means for receiving a signal strength indicator and a frequency error estimate from each of the plurality of inner loops;
means for limiting each signal strength indicator to a maximum signal strength parameter;
means for computing a weighted average frequency error over the plurality of frequency error estimates weighted by the respective plurality of limited signal strength indicators; and
means for generating a timing reference control signal in response to the weighted average frequency error.

26. The apparatus of claim 25, further comprising means for limiting the weighted average frequency error to a maximum frequency error parameter prior to generating the timing reference control signal.

27. An apparatus, comprising:
means for receiving a signal strength indicator and a frequency error estimate from each of the plurality of inner loops;
means for computing a weighted average frequency error over the plurality of frequency error estimates weighted by the respective plurality of signal strength indicators;
means for limiting the weighted average frequency error to a maximum frequency error; and
means for generating a timing reference control signal in response to the limited weighted average frequency error.

28. A wireless communication system, including a wireless communication device, comprising:
means for receiving a signal strength indicator and a frequency error estimate from each of the plurality of inner loops;
means for limiting each signal strength indicator to a maximum signal strength parameter;
means for computing a weighted average frequency error over the plurality of frequency error estimates weighted by the respective plurality of limited signal strength indicators; and
means for generating a timing reference control signal in response to the weighted average frequency error.

29. Processor readable media operable to perform the following steps:
receiving a signal strength indicator and a frequency error estimate from each of the plurality of inner loops;
limiting each signal strength indicator to a maximum signal strength parameter;
computing a weighted average frequency error over the plurality of frequency error estimates weighted by the respective plurality of limited signal strength indicators; and
generating a timing reference control signal in response to the weighted average frequency error.

30. Processor readable media operable to perform the following steps:
receiving a signal strength indicator and a frequency error estimate from each of the plurality of inner loops;
computing a weighted average frequency error over the plurality of frequency error estimates weighted by the respective plurality of signal strength indicators;
limiting the weighted average frequency error to a maximum frequency error; and
generating a timing reference control signal in response to the limited weighted average frequency error.

* * * * *